Figures 1, 2:
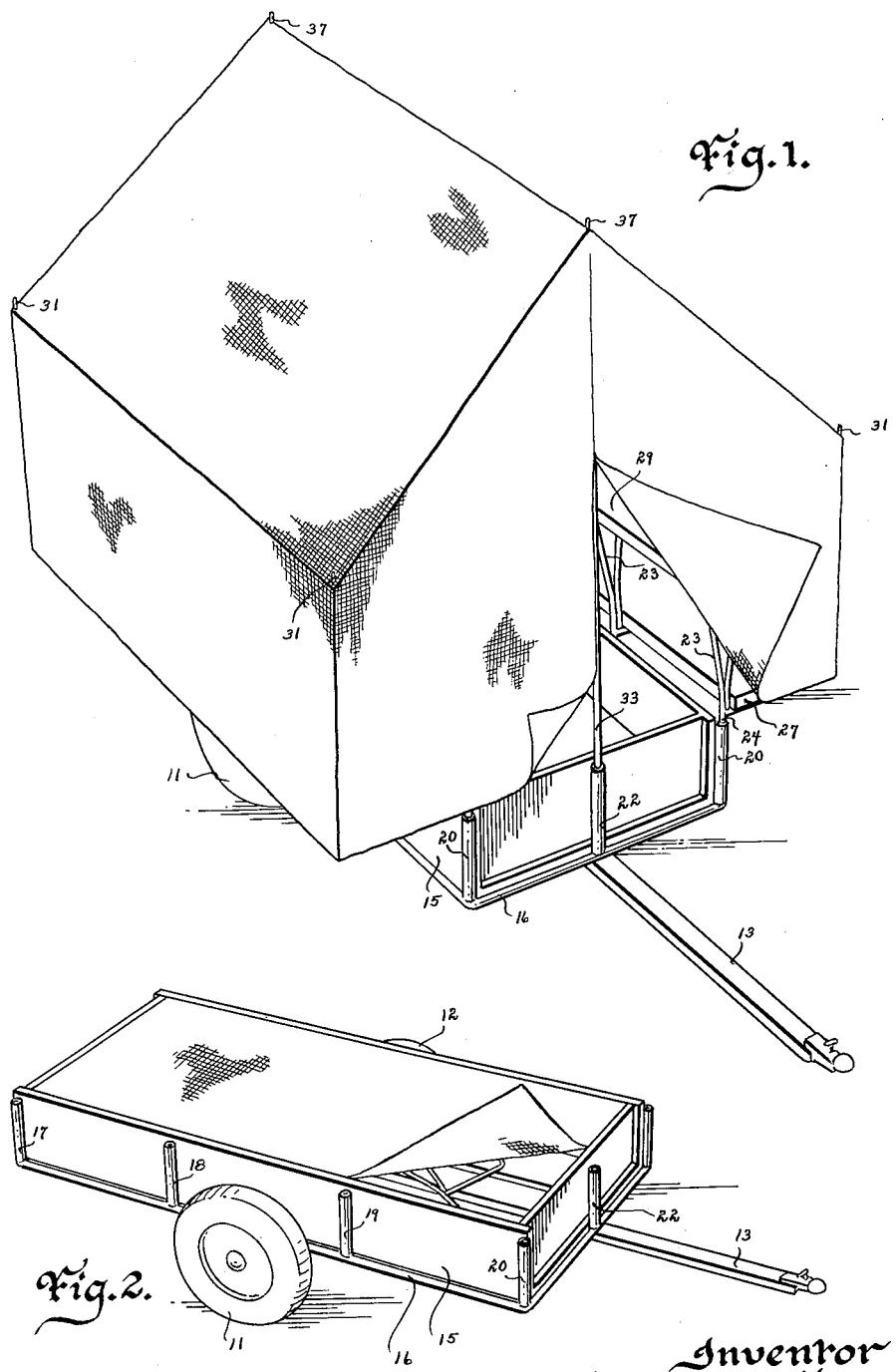

May 1, 1962 E. E. FISCHER 3,032,369
EXPANDABLE TRAILER HOUSE
Filed June 18, 1959 2 Sheets-Sheet 1

Inventor
Eugene E. Fischer
by M. Talbert Dick
Attorney

Witness
Edward P. Seeley

May 1, 1962 E. E. FISCHER 3,032,369
EXPANDABLE TRAILER HOUSE
Filed June 18, 1959 2 Sheets-Sheet 2
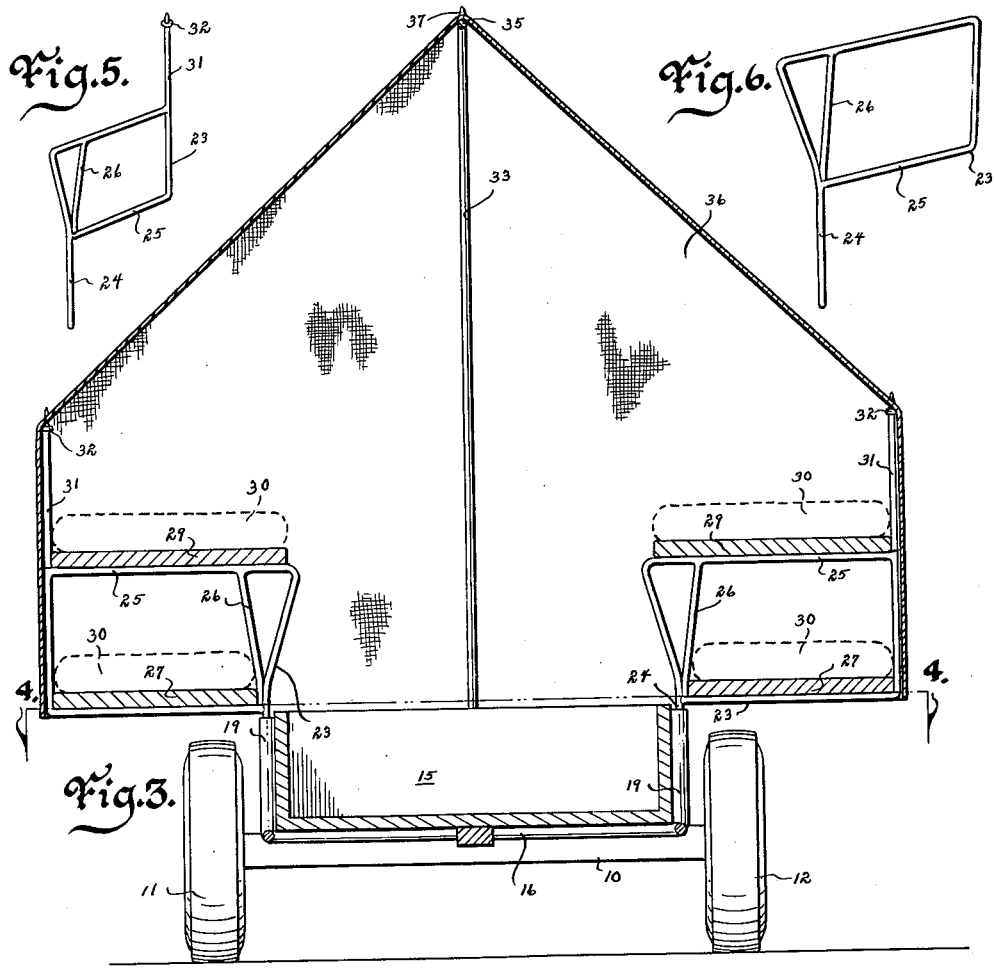
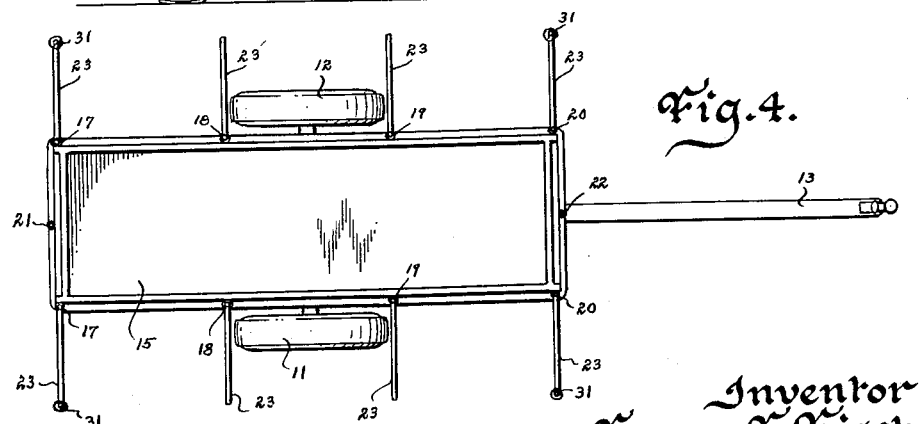
Witness
Edward P. Seeley
Inventor
Eugene E. Fischer
by M. Talbert Dick
Attorney

United States Patent Office 3,032,369
Patented May 1, 1962

3,032,369
EXPANDABLE TRAILER HOUSE
Eugene E. Fischer, Paton, Iowa
(335 E. Magnolia, Fort Collins, Colo.)
Filed June 18, 1959, Ser. No. 821,275
4 Claims. (Cl. 296—23)

This invention relates to a trailer house adapted to be pulled by a prime mover and more particularly one that may be collapsed during transit, and extended for living usage.

The use of collapsible trailer houses is not new. However, herebefore they were complicated, cumbersome, and expensive. Also, they required considerable time and labor to change them from an extended condition to a collapsed, folded, or telescoped position, and vice versa.

Therefore, one of the principal objects of my invention is to provide a trailer house that may be easily and quickly extended into a successful shelter or collapsed for road travel.

More specifically, the object of this invention is to provide a trailer house capable of having its floor area expanded and with an erectable tent as the walls and canopy.

A further object of my invention is to provide a trailer house that is light of weight.

A still further object of this invention is to provide a trailer house with a maximum of storage space.

Still further objects of my invention are to provide a trailer house that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my device in expanded condition,

FIG. 2 is a perspective view of my trailer house disassembled for transportation, FIG. 3 is an enlarged cross sectional view of the trailer house and more fully illustrates its construction, FIG. 4 is a reduced top plan view of the device prior to the placement of the boards and canopy portion thereon, FIG. 5 is a perspective view of one of the corner supporting brackets, and FIG. 6 is a perspective view of one of the intermediate supporting brackets.

In these drawings I have used the numeral 10 to designate a vehicle chassis supported by the two wheels 11 and 12. The numeral 13 designates a tongue secured to the front end of the chassis and which is adapted to be secured to a pulling vehicle such as an automobile or like. The numeral 15 designates an open top box on the chassis 10, as shown in FIG. 2. Operatively secured to the chassis and the box 15 is a horizontal railing embracing the outside lower portion of both the sides and ends of the box 15 as shown in FIG. 4. At each side of the box 15 are four spaced apart vertically upwardly extending tubular members 17, 18, 19 and 20 having their lower ends secured to the frame railing 16. The two tubular members 17 and 20 at each side of the box 15 are positioned at the corners of the box 15, respectively, as shown in FIG. 2. On the horizontal railing 16, centrally located, and at each end of the box 15, is a like upwardly extending tubular member. These two tubular members have been designated by the numerals 21 and 22. Detachably slidably extending into each of the tubular members 17, 18, 19 and 20, I have a supporting bracket generally designated by the numeral 23. Each of these brackets has a leg 24 for detachably slidably extending into one of the tubular members. Also, each bracket has a substantially rectangular rod portion 25, as shown in FIG. 5. This rectangular portion, as well as the entire bracket, is of rod construction. In each rectangular portion of the bracket is a brace rod 26 which extends from the lower inner corner of the rectangular portion and which is adjacent the top of the vertical leg 24, and thence upwardly and inwardly to the top horizontal member of the rectangular portion. The inner end of the rectangular portion extends upwardly and inwardly as shown in FIG. 3, and this end with the brace 26 provides an inverted A-structure for giving strength to the bracket and to also provide a longer horizontal length of the upper portion of the rectangular portion of the bracket than its lower horizontal rod portion.

In assembling the device, the eight brackets 23 are slidably placed in the tubular members 17, 18, 19 and and 20 and are swung laterally outwardly from the box 15, as shown in FIG. 4. A board, plank, or like, 27 is detachably placed on the inside of the rectangular portions of the four brackets on each side of the box 15. These boards or like 27 rest on and are supported by the lower horizontal rod of the rectangular portion of the brackets, as shown in FIG. 3. A plank, board, or like, 29 is laid onto the tops of the four brackets at each side of the box 15. These boards or like 29, due to the structure of the brackets, have a width greater than that of the width of the boards or like 27, as shown in FIG. 3. By this arrangement of parts, the boards or like 27 and 29 will be spaced apart from each other and will provide supporting bases for sleeping mattresses or like 30. Thus, above and beyond the wheels of the trailer, at least four people may sleep on the four boards or like 27 and 29. Additional individuals may sleep on the floor of the box 15. If desired, the boards or like 29 may be used in the daytime as table tops or like. On each of the brackets 23 that are in the corner tubular members 17 and 20, I extend upwardly from the outer end of the rectangular portion, a post 31, as shown in FIG. 5. Each of these upwardly extending posts 31 has a stop 32 near its upper free end. Slidably detachably extending into the centrally located end tubular members 21 and 22, is a tent post 33. These two end tent posts are connected together at their tops by the horizontal tent crossbar 35. The numeral 36 designates an ordinary flexible tent. When in use, this tent 36 has its top central portion extended over the crossbar 35, and downwardly at each side of the tent post 33 in the usual manner. At the top of each of the tent posts 33 is an upwardly extending projection 37 which extends through the top of the tent and holds its upper area securely to the tent supporting means just described. The sides of the tent extend downwardly and the pointed upper ends of the members 31 of the brackets extend through the lower areas of the roof of the tent, as shown in FIG. 3. The movement of the tent downwardly on the members 31 is limited by the stops 32. The sides of the tent extend downwardly to the outside of the brackets, as shown in FIG. 1. The two ends of the tent extend downwardly at the outer sides of the tent post 33. The tent is of the usual common structure having the entrance flap 39.

When the trailer house is so assembled and expanded, it provides shelter for sleeping, eating and living purposes. When the trailer house is transported, it is of course materially reduced in size by the removal of the tent, the tent posts and crossbar, the boards or like 27 and 29, sleeping mattresses, and the brackets. All of these separate items may be stored in the box 15, as shown in FIG. 2. The tent 36 may be folded and used as a cover for the disassembled parts placed in the box 15.

If desired, the brackets may be left in their supporting tubular members 17, 18, 19 and 20. However, when this is done they should be swung to the sides of the box 15 and secured against outward swinging movement. After the various elements of the trailer house have been disassembled and packed, the trailer is most compact and is easily transported back of a relatively small automobile or like. The disassembling of my trailer house is easy and rapid. Also, its assembly into an expanded condition is accomplished with little effort and with small loss of time. If the device is to be used as living quarters over an extended period of time, it may be desirable to place supporting members under the outer ends of the brackets and under the chassis frame.

Some changes may be made in the construction and arrangement of my expandable trailer house without departing from the real spirit and purpose of my invention, and it is my intention to cover by my claims, any modified forms of structure or use of mechanical equivalents which may be reasonably included within their scope.

I claim:

1. In an expandable trailer house, a chassis having a box; said box having a bottom, two sides, two ends and having its top open, wheels supporting said chassis, a plurality of upwardly extending tubular members operatively secured to said chassis and at each side of said box, a bracket member having a downwardly extending leg in each of said tubular members; each of said bracket members having an open rectangular frame portion consisting of a lower horizontal bar, two upwardly extending side bars, and an upper horizontal bar, a plank detachably resting on the lower horizontal bars of the bracket members that are at one side of said box, a plank detachably resting on the lower horizontal bars of the bracket members at the other side of said box, a plank detachably resting on the upper horizontal bars of the bracket members that are at one side of said box, and a plank detachably resting on the upper horizontal bars of the bracket members at the other side of said box.

2. In an expandable trailer house, a chassis having a box; said box having a bottom, two sides, two ends and having its top open, wheels supporting said chassis, a plurality of upwardly extending tubular members operatively secured to said chassis and at each side of said box, a bracket member having a downwardly extending leg rotatably mounted in each of said tubular members; each of said bracket members having an open rectangular frame portion consisting of a lower horizontal bar, two upwardly extending side bars, and an upper horizontal bar, a plank detachably resting on the lower horizontal bars of the bracket members that are at one side of said box, a plank detachably resting on the lower horizontal bars of the bracket members at the other side of said box, a plank detachably resting on the upper horizontal bars of the bracket members that are at one side of said box, and a plank detachably resting on the upper horizontal bars of the bracket members at the other side of said box.

3. In an expandable trailer house, a chassis having a a box; said box having a bottom, two sides, two ends and having its top open, wheels supporting said chassis, a plurality of upwardly extending tubular members operatively secured to said chassis and at each side of said box, a bracket member having a downwardly extending leg in each of said tubular members; each of said bracket members having an open rectangular frame portion consisting of a lower horizontal bar, two upwardly extending side bars, and an upper horizontal bar, a plank detachably resting on the lower horizontal bars of the bracket members that are at one side of said box, a plank detaochably resting on the lower horizontal bars of the bracket members at the other side of said box, a plank detachably resting on the upper horizontal bars of the bracket members that are at one side of said box, a plank detachably resting on the lower horizontal bars of the bracket members at the other side of said box, an upwardly extending tubular member operatively secured at each end of said box, an inverted U-shaped tent supporting means detachably extending into said last two mentioned tubular members, and a tent detachably supported at its center on said tent supporting means, and extending outwardly therefrom in both side directions, to the outer sides of said bracket members at each side, respectively of said box.

4. In an expandable trailer house, a chassis having a box; said box having a bottom, two sides, two ends and having its top open, wheels supporting said chassis, a plurality of upwardly extending tubular members operatively secured to said chassis and at each side of said box, a bracket member having a downwardly extending leg in each of said tubular members; each of said bracket members having an open rectangular frame portion consisting of a lower horizontal bar, two upwardly extending side bars, and an upper horizontal bar, a plank detachably resting on the lower horizontal bars of the bracket members that are at one side of said box, a plank detachably resting on the lower horizontal bars of the bracket members at the other side of said box, a plank detachably resting on the upper horizontal bars of the bracket members that are at one side of said box, a plank detachably resting on the upper horizontal bars of the bracket members at the other side of said box; the open rectangular frame portion of each of said brackets having its upper horizontal rod of a length greater than that of the length of its lower horizontal rod, and a substantially vertical brace rod in each of the rectangular frame portions of said brackets having its upper end secured to the upper horizontal rod above it and its lower end secured to the lower horizontal rod below it.

References Cited in the file of this patent

UNITED STATES PATENTS

| Re. 13,036 | Humphries | Nov. 9, 1909 |
| 2,290,535 | Cavins | July 21, 1942 |
| 2,719,054 | Jennings | Sept. 27, 1955 |
| 2,729,501 | Van Doorne | Jan. 3, 1956 |
| 2,846,262 | Ray | Aug. 5, 1958 |
| 2,906,556 | Cantele | Sept. 29, 1959 |

FOREIGN PATENTS

| 589,404 | France | Feb. 20, 1925 |